United States Patent
Sasaki

[19]

[11] Patent Number: 5,980,111
[45] Date of Patent: *Nov. 9, 1999

[54] LINEAR GUIDE DEVICE OF SOLID LUBRICATION TYPE

[75] Inventor: Akira Sasaki, Tokyo, Japan

[73] Assignee: Kabushiki Kaisha Toshiba, Kawasaki, Japan

[ * ] Notice: This patent is subject to a terminal disclaimer.

[21] Appl. No.: 08/963,865

[22] Filed: Nov. 4, 1997

[30] Foreign Application Priority Data

Nov. 12, 1996 [JP] Japan ................................. 8-300496

[51] Int. Cl.$^6$ ..................................... F16C 29/06
[52] U.S. Cl. ................. 384/45; 384/13; 384/902
[58] Field of Search ................. 384/13, 463, 43, 384/44, 45

[56] References Cited

U.S. PATENT DOCUMENTS

| | | | |
|---|---|---|---|
| 5,240,331 | 8/1993 | Ninomiya et al. | 384/45 |
| 5,374,126 | 12/1994 | Akasako et al. | 384/15 |
| 5,741,078 | 4/1998 | Sasaki | 384/13 X |

FOREIGN PATENT DOCUMENTS

| | | |
|---|---|---|
| 0 794 343 | 9/1997 | European Pat. Off. . |
| 2 738 603 | 3/1997 | France . |

OTHER PUBLICATIONS

Patent Abstracts of Japan, vol. 007, No. 055 (M–198), Mar. 5, 1983, JP 57 200726, Dec. 9, 1982.

Patent Abstracts of Japan, vol. 017, No. 500 (M–1477), Sep. 9, 1993, JP 05 126150, May 21, 1993.

*Primary Examiner*—Thomas R. Hannon
*Attorney, Agent, or Firm*—Oblon, Spivak, McClelland, Maier & Neustadt, P.C.

[57] ABSTRACT

The linear guide device has a structure in which a solid lubricating film is applied on the ball guide grooves of the main rail and the ball circulating paths of the slider, and the surfaces of the balls housed to be rotatable and movable in the ball circulating paths, are formed porous. Thus, when the slider is urged to move with respect to the main rail, and the balls rotate and move within the ball circulating paths, the balls are brought into contact with the solid lubricating films on the ball circulating paths and the films on the ball guide grooves of the main rail. Due to the effect of the surfaces of the balls, the solid lubricating film is transferred onto the surfaces of the balls, thus achieving solid lubrication.

16 Claims, 2 Drawing Sheets

LINEAR GUIDE DEVICE OF SOLID LUBRICATION TYPE

BACKGROUND OF THE INVENTION

1. Field of the Invention

The present invention relates to a linear guide device adapted for use in an extreme environment such as a cosmic space or vacuum environment.

2. Discussion of the Background

In general, a space craft such as an artificial satellite is provided with various types of equipment devices, including an antenna device, and a conventional linear guide device is built on each of the liner driving mechanisms or the like for these devices. The linear guide device has a structure in which a pair of guide grooves are provided so as to interpose a guide rail for the main rail, between the guide grooves, and a slider is engaged with the guide rail of the main rail to be linearly movable.

In the slider, a ball circulating path having a ring-like shape, is formed so as to correspond to a ball guide groove of the main rail. In the ball circulating path, a plurality of balls are housed to be movable therein as they rotate. The ball circulating path has an opening at a predetermined position, so as to oppose to the ball guide groove of the main rail. With this structure, when the slider is urged to move in the direction of the rail guide portion of the main rail, these balls in the circulating path move as they rotate. When they move, some of these balls are brought into contact with the ball guide groove of the main rail, and therefore a linear motion is allowed.

However, in the case where the linear guide device of the type described above, is used in a cosmic space of a ultra-high temperature vacuum environment, it is very difficult to employ the general lubricating method using oil or grease, though it can be normally employed on the ground. Instead, for the linear guide device used in a cosmic space, a so-called solid lubricating method is employed for lubricating the members of the device. With this method, a solid lubricating film, which is made of a solid lubricant such as molybdenum disulfide, is formed on the ball guide groove of the main rail, the surface of each ball and the ball circulating path, by the spattering technique, ion-plating, or the plating or coating technique.

However, in the case where a solid lubricating film is formed by the former ones, that is, spattering or ion-plating technique, the linear guide device entails the following drawback. That is, although it is possible to form such a film on the ball guide groove of the main rail or the ball circulating path of the slider, to have predetermined thickness and size, the film cannot be easily formed with high precision on the surface of such a small ball. Therefore, the absolute amount of the solid lubricating film is always too short, which results in short life.

In the case where a solid lubricating film is formed by the latter ones, that is, the plating or coating technique, it is very difficult to prepare a thin film, and therefore powdery materials are easily created due to abrasion. Consequently, a so-called rattle occurs between the slider and the main rail, which further creates abrasion powdery materials. As a result, the friction resistance acting between each other is increased, making it easier to decrease the precision.

The above-described drawback also occurs in an extreme environment on the ground, such as a vacuum atmosphere where oil or grease cannot be easily used as a lubricant.

SUMMARY OF THE INVENTION

The object of the present invention is to provide a linear guide device made of a simple structure such that lubrication at high precision can last over a long period of time, thereby achieving a long life.

The object of the present invention can be achieved by a linear guide device including: a main rail having ball guide grooves each coated with a solid lubricating film, formed on both sides of a guide rail; a slider, engaged movably with the guide rail of the main rail, and provided with a ring-like ball circulating path on which a solid lubricating film is formed, the ball circulating path having openings made along the ball guide grooves of the main rail; and a plurality of balls housed in the ball circulating path of the slider so as to be movable as they rotate, these balls rotating and moving while a surface of each ball being exposed from the opening of the ball circulating path, and being in contact with the ball guide grooves of the main rail when a relative position between the slider and the guide rail of the main rail varies, and the surface of each ball being formed to be porous such that the solid lubricating film formed on the ball guide grooves and the ball circulating path is transferred to the porous surface of each ball as rotating and moving, thereby achieving lubrication.

Additional objects and advantages of the invention will be set forth in the description which follows, and in part will be obvious from the description, or may be derived by practice of the invention. The object and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

An embodiment of the present invention will now be described with reference to accompanying drawings.

Figure 1:
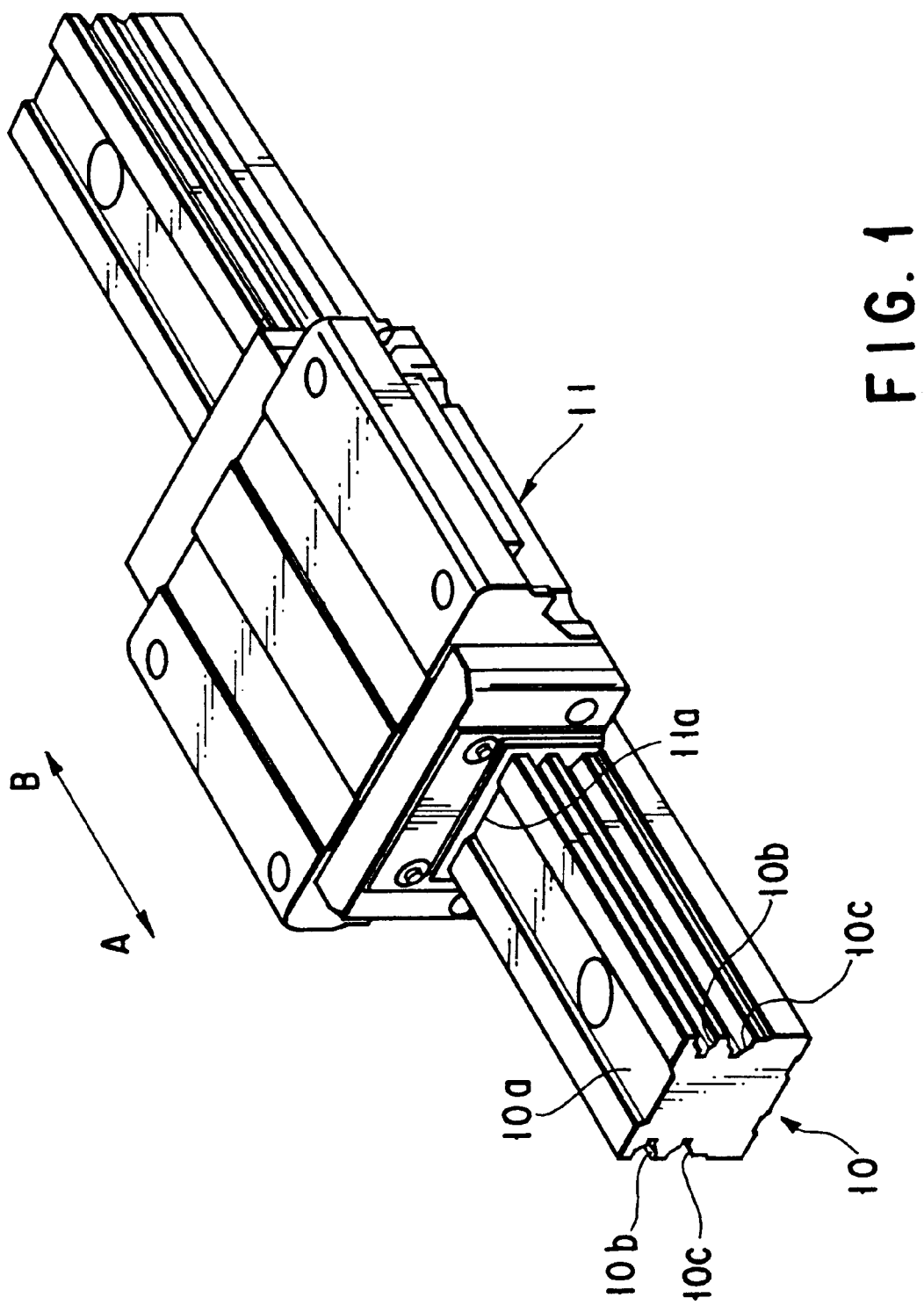
FIG. 1 is a perspective view showing an outline of a linear guide device according to an embodiment of the present invention.
Figure 2:
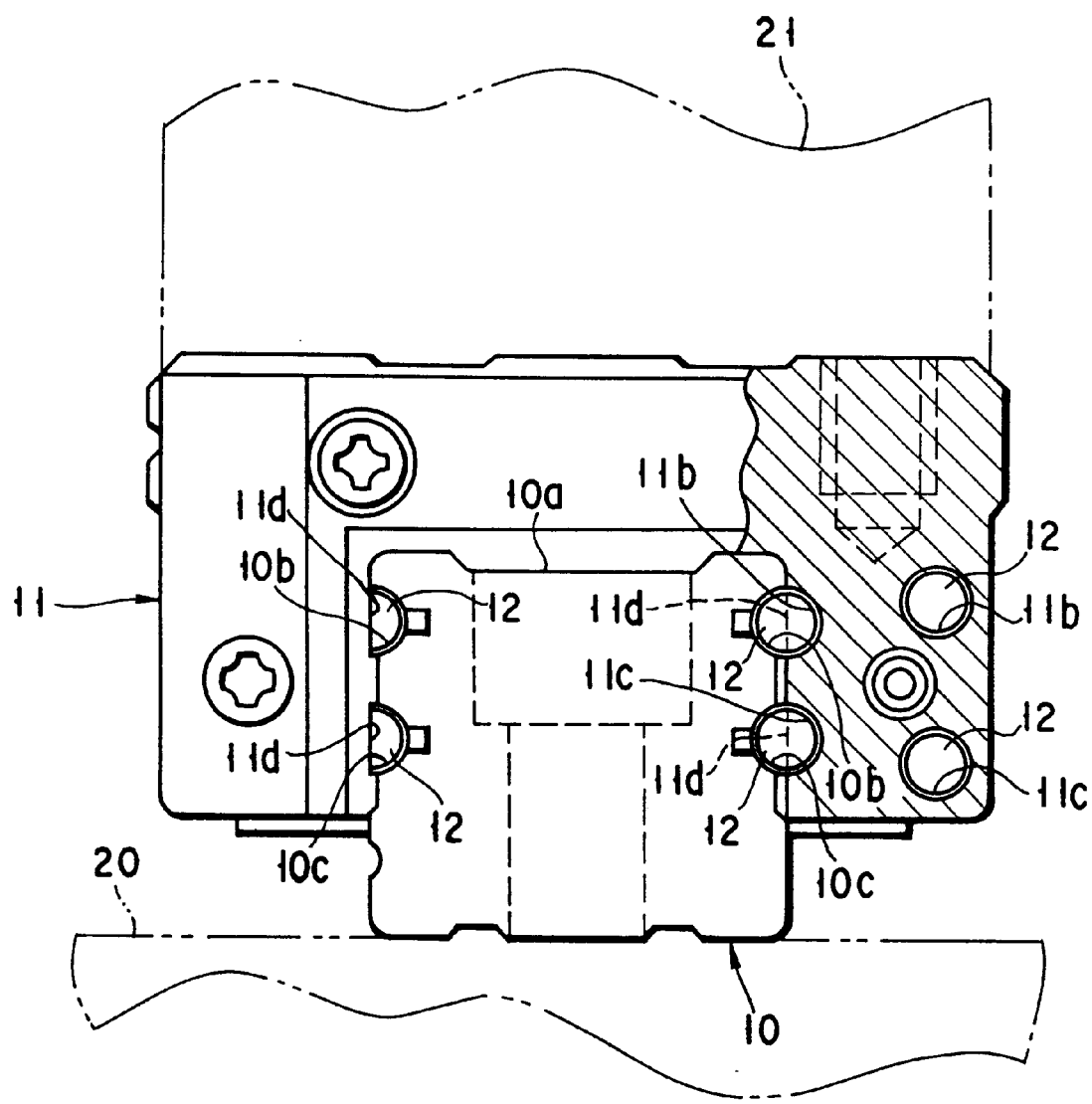
FIG. 2 is a front view showing a slider shown FIG. 1, with a partial cross sectional view thereof.

FIG. 1 shows a linear guide device according to an embodiment of the present invention, and as shown in this figure, a main rail 10 has a guide rail 10a formed in the moving direction (indicated by arrows A and B). The main rail 10 is mounted to a fixed-side supporter 20 of a linear motion mechanism, for example, as shown in FIG. 2. On both sides of the guide rail 10a, a pair of ball guide grooves 10b and 10b (10c and 10c) are made along the moving direction, in two steps and substantially parallel to each other. Then, a solid lubricant film is formed on the inner wall of each of the ball guide grooves 10b and 10b (10c and 10c) of the guide rail 10a by the spattering method, the ion-plating method or the like.

Further, a slider 11 having an open-ended rectangular shape is set movably in the directions indicated by arrows A and B, on the main rail 10a of the main rail 10. The slider 11 is mounted to a moving-side supporter 21 of the linear motion mechanism, and a guide portion 11a is provided at the central section thereof so as to correspond to a guide rail 10a of the main rail 10. The slider 11 has side portions between which the guide portion 11a is interposed, and in both side portions, ring-like ball circulating paths 11b and 11c are made so as to correspond respectively to the ball guide grooves 10b of the main rail 10.

The inner surface of each of the ball circulating paths 11b and 11c is coated with a solid lubricating film made by the spattering or ion-plating technique or the like. Further, the ball circulating paths 11b and 11c have openings lid at predetermined positions, so as to correspond to the ball guide grooves 10b and 10c of the main rail 10. Each of the ball circulating paths 11b and 11c of the slider 11 contains a plurality of balls 12 to be rotatable and movable. Each of these balls 12 has a surface made to be porous. These balls 12 can rotate and move while a portion of each ball projects out of the opening 11d of the ball circulating path 10b (10c), and is brought into contact with the ball guide grooves 10b and 10c of the main rail 10. Thus, these balls 12 serve to assist the guide portion 11a of the slide 11 to move linearly on the guide rail 10a of the main rail 10.

The main rail 10, the slider 11 and the balls 12 are made of metal materials such as bearing steel, stainless steel, heat resisting steel, alloy tool steel and high speed steel. The solid lubricating film formed on the inner surfaces of the ball guiding grooves 10b and 10c of the main rail 10, and the ball circulating paths 11b (11c) of the slider 11 may be $MoS_2$ film made by the spattering method, Au, Ag or Pb film or the like, made by the ion-plating method, or $MoS_2$ film or the like made by the coating method.

It should be noted that the solid lubricating films applied on the ball guiding grooves 10b and 10c and the ball circulating paths 11b, should be made of the same material or a similar type of material.

The porous surface of each ball 12 should be finished to have a porous state of, for example, a submicron order, by an oxalating treatment, phosphating treatment, nitrating treatment, or the like.

With the above-described structure, when the motion-side supporter 21 is linearly moved in the directions indicated by the arrows A and B, the guide portion 11a of the slider 11 is urged to move on the guide rail 10a of the main rail 10 in the directions indicated by the arrows A and B. Thus, the balls 12 rotate and move within the ball circulating paths 11b and 11c of the slider 11, thereby assisting the slider to linearly move.

While they are rotating, portions of the balls 12 are in contact with the ball guide grooves 10b and 10c of the main rail 10, through the openings 11d of the ball circulating paths 11b and 11c. In this manner, the balls 12 are brought into contact with the solid lubricating films made on the ball circulating paths 11b and 11c, and with those formed on the ball guiding grooves 10b and 10c of the main rail 10. As they rotate on these films, the solid lubricating films are transferred onto the surface portions of the balls due to the porous state of the surfaces. As these balls 12 rotate and move, solid-lubrication is achieved by the pieces of the solid lubricating film transferred on the porous surfaces of the balls 12, and the solid lubricating films formed on the ball circulating paths 11b and 11c and the rail guide grooves 10b and 10c.

Thus, the thickness of each solid lubricating film can be set to minimum, and therefore it becomes possible to avoid an increase in the friction resistance between the slider 11 and the main rail 10, caused by the powdery materials made from the solid lubricating films generated when the balls 12 rotate and move. Consequently, the solid lubrication can be achieved stably for a long time.

As described above, the linear guide device is formed to have the structure summarized as follows. That is, a solid lubricating film is applied on the ball guide grooves 10b and 10c of the main rail 10 and the ball circulating paths 11b and 11c of the slider 11, and the surfaces of the balls 12 housed to be rotatable and movable in the ball circulating paths 11b and 11c, are formed porous. Thus, when the slider 11 is urged to move with respect to the main rail 10, and the balls 12 rotate and move within the ball circulating paths 11b and 11c, the balls 12 are brought into contact with the solid lubricating films on the ball circulating paths 11b and 11c and the films on the ball guide grooves 10b and 10c of the main rail 10. Due to the effect of the surfaces of the balls 12, the solid lubricating film is transferred, thus achieving solid lubrication.

Thus, the solid lubricating films formed on the ball circulating paths 11b and 11c and the rail guide grooves 10b and 10c is transferred onto the balls 12, thereby achieving solid lubrication. Consequently, the creation of the powdery materials from the solid lubricating film being abraded, which is caused as the balls 12 rotate and move, can be prevented, thus making it possible to avoid an increase in the friction resistance between the slider 11 and the main rail 10 due to the powdery materials made by the abrasion. As a result, a high-precision operation of the device can be carried out for a long period of time, thus achieving a long life of the device.

Further, since the creation of the powdery materials, caused by the linear motion of the slider 10, can be prevented, the generation of the "rattle" caused by the abrasion of the solid lubricating films formed on the ball circulating paths 11b and 11c and the ball guide grooves 10b and 10c. In this respect, a high-precision operation can be performed for a long period of time.

It should be noted that the above embodiment was described in connection with the case where the present invention is applied to an apparatus used in a cosmic space, but the use of the present invention is not limited to such an embodiment. The present invention can be applied to an extreme environment such as a vacuum atmosphere where it is very difficult to use oil or grease. In such an extreme environment, substantially the same effect can be expected.

Further, the above embodiment was described in connection with the case where the rail 10 is set to the fixed-side supporter 20, and the slider 11 is set to the motion-side supporter 21. However, the present invention is not limited to such an embodiment, but it is possible to form a structure in which the main rail 10 is set to the motion-side supporter 21, and the slider is set to the fixed-side supporter 20 such that the main rail 10 linearly moves with respect to the slider 11.

Naturally, the present invention is not limited to the above cases, but can be modified into various version as long as the technique remains within the range of the essence of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. A linear guide device comprising:

a main rail having a pair of ball guide grooves and a linear guide rail which is interposed between said ball guide grooves, which extend substantially parallel to said ball guide grooves, and which has an inner wall coated with a solid lubricating film;

a slider movably mounted on said guide rail of said main rail, and having an inner wall coated with a solid lubricating film, and ball circulating paths having opening portions located opposite to said ball guiding grooves of said main rail; and a plurality of balls movably provided in said ball circulating paths of said slider such that when a movement urging force is applied between said slider and said main rail, said balls are partially exposed from said opening portions of said ball circulating paths and rotatably moved while contacting said ball guide grooves of said main rail, and said balls having porous surfaces, to which solid lubricant is transferred from the solid lubricant films on said ball guide grooves and said ball circulating paths as said balls rotatably moves.

2. A linear guide device according to claim 1, wherein the porous state of the surface portions of said plurality of balls is formed by an oxalating treatment.

3. A linear guide device according to claim 1, wherein the porous state of the surface portions of said plurality of balls is formed by a phosphating treatment.

4. A linear guide device according to claim 1, wherein the porous state of the surface portions of said plurality of balls is formed by a nitrating treatment.

5. A linear guide device according to claim 1, wherein the solid lubricating films formed on said ball guiding grooves and said ball circulating path are made of the same material, or similar types of materials.

6. A linear guide device according to claim 5, wherein the porous state of the surface portions of said plurality of balls is formed by an oxalating treatment.

7. A linear guide device according to claim 5, wherein the porous state of the surface portions of said plurality of balls is formed by a phosphating treatment.

8. A linear guide device according to claim 5, wherein the porous state of the surface portions of said plurality of balls is formed by a nitrating treatment.

9. A linear guide device according to claim 1, wherein said plurality of balls are formed such that said surfaces each have a porous state of a submicron order.

10. A linear guide device according to claim 9, wherein the porous state of the surface portions of said plurality of balls is formed by an oxalating treatment.

11. A linear guide device according to claim 9, wherein the porous state of the surface portions of said plurality of balls is formed by a phosphating treatment.

12. A linear guide device according to claim 9, wherein the porous state of the surface portions of said plurality of balls is formed by a nitrating treatment.

13. A linear guide device according to claim 9, wherein the solid lubricating films formed on said ball guiding grooves and said ball circulating path are made of the same material, or similar types of materials.

14. A linear guide device according to claim 13, wherein the porous state of the surface portions of said plurality of balls is formed by an oxalating treatment.

15. A linear guide device according to claim 13, wherein the porous state of the surface portions of said plurality of balls is formed by a phosphating treatment.

16. A linear guide device according to claim 13, wherein the porous state of the surface portions of said plurality of balls is formed by a nitrating treatment.

* * * * *